J. C. WILSON.
METHOD OF AND APPARATUS FOR CONTROLLING THE FLOW OF FLUIDS.
APPLICATION FILED OCT. 25, 1917.

1,437,626.

Patented Dec. 5, 1922.

Witnesses:
Robert Heyer
Arthur W. Cashen

Inventor
John C. Wilson
by Calvin B. H. Tower Jr. Atty

J. C. WILSON.
METHOD OF AND APPARATUS FOR CONTROLLING THE FLOW OF FLUIDS.
APPLICATION FILED OCT. 25, 1917.

1,437,626.

Patented Dec. 5, 1922.
7 SHEETS—SHEET 4.

J. C. WILSON.
METHOD OF AND APPARATUS FOR CONTROLLING THE FLOW OF FLUIDS.
APPLICATION FILED OCT. 25, 1917.

1,437,626.

Patented Dec. 5, 1922.

Patented Dec. 5, 1922.

1,437,626

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

METHOD OF AND APPARATUS FOR CONTROLLING THE FLOW OF FLUIDS.

Application filed October 25, 1917. Serial No. 198,554.

*To all whom it may concern:*

Be it known that I, JOHN C. WILSON, a citizen of the United States, residing at Milwaukee, in tne county of Milwaukee and State of Wisconsin, have invented new and useful Improvements in Methods of and Apparatus for Controlling the Flow of Fluids, of which the following is a specification.

This invention relates to the regulation and control of the flow of fluids. It relates more particularly to the regulation and control of the flow of fluids used in chemical processes and combustion processes and to the proportioning of the constituents supplied to such processes.

In combustion processes air is usually one of the constituents of the combustible mixture and is used because of the oxygen which it contains. The oxygen content is therefore the factor which should determine the proportion of air to be used.

In many cases it is important that the proper amount of oxygen be supplied. If not enough oxygen is supplied, complete combustion does not occur and a portion of the fuel is wasted. In some cases, the chemical actions, such as reducing actions, due to the excess of fuel, cause injurious effects upon the material being heated. On the other hand, an excess of oxygen may cause oxidizing effects which might be injurious to the material being heated.

It is therefore desirable to control the oxygen supply relative to the fuel supply so that certain fixed proportions will be continuously maintained.

When the proportion of the air supply with respect to the fuel supply is obtained by volumetric measurement of the air, the proportion of oxygen supplied will remain constant only if the temperature, pressure, and saturation conditions of the atmosphere remain constant, and this is seldom the case. The amount of oxygen contained in a cubic foot of air varies with temperature, pressure or saturation conditions of the atmosphere, and therefore a regulating system based on a volumetric measurement of the air does not supply the proper quantity of oxygen under all conditions.

The manner in which the oxygen content in a given volume of air varies with variations in temperature, pressure, or saturation conditions of the atmosphere will be apparent from the following explanation:

The standard quantity unit of air may be defined as a standard cubic foot volume of dry air at an absolute pressure of 30 inches of mercury and at a temperature of 60 degrees Fahrenheit. The standard unit quantity of oxygen is the quantity of oxygen contained in the standard unit of air as above defined.

An inch variation in the barometer, as from 30 inches to 29 inches, causes about 3% change in the volume of the unit quantity of air.

If the temperature of the unit quantity is increased from 60 degrees to 100 degrees its volume will be increased to approximately 1.077 cubic feet. If while at 100 degrees temperature this standard unit quantity is allowed to absorb all the water which it will hold as a vapor its volume will be further increased to approximately 1.13 cubic feet.

Any one of the above variations therefore causes a considerable change in the volume of the unit quantity of air. If more than one of the variations occur at the same time, the change in the volume of the unit of air is obviously augmented. For instance, from the above example, on a hot day with the atmosphere at 100 degrees and saturated, the standard unit quantity has expanded not only because of its increased temperature, but also because of its saturated condition so that the combined effect is a volume about 13% greater than its original volume.

The volume of the original unit quantity of air therefore varies from day to day. It may be a true cubic foot one day and on the following day it may be less than a cubic foot or greater than a cubic foot. In either instance the unit contains the same amount of oxygen. If the original unit quantity becomes greater than a true cubic foot in volume through expansion, a portion of air must be removed from the unit to make it a true cubic foot in volume. On the other hand if the original unit quantity becomes smaller than a true cubic foot in volume through contraction it must be supplemented by an additional quantity of air to make it a true cubic foot in volume. In the first instance a portion of the oxygen content is removed from the original quantity unit and hence the true cubic foot volume does not contain as much oxygen as the original quantity unit. In the second instance some oxygen is added to the oxygen content of the original quantity unit and the true cubic foot volume contains more oxygen than the original quantity unit. Therefore a true cubic foot volume of air may contain a certain amount of oxygen at one time and a different amount of oxygen at a subsequent time under different atmospheric conditions.

It will now be obvious that if the air supply in a combustion process is controlled by a volumetric measurement of the air, the quantity of oxygen is not properly controlled under varying atmospheric conditions. A volume of air supplied on one day may contain a certain amount of oxygen, and the same volume supplied on a different day may contain a different quantity of oxygen. In the case of a blast furnace in which solid fuel, such as coke, is employed, the coke and ore can be quite accurately analyzed and can be very accurately weighed. The air supplied to the blast furnace is usually estimated by the number of strokes per minute of a reciprocating blower. A cylinder full of air represents a certain volume of air pumped to the furnace. If temperature, pressure, and saturation conditions of the atmosphere remain constant, this would probably give satisfactory results, but the above conditions do not remain constant. Therefore, if a given furnace with a given rate of ore and coke supply gives good results with a given rate of blower engine revolutions one day, it does not necessarily follow that this same speed of the blower will give similar results the next day, on account of the change in the quantity of oxygen in each volumetric unit of the air.

From the foregoing it will be seen that the air supply should not be measured volumetrically but should be measured by some means which will vary the quantity of air in such a way as to cause the oxygen to be supplied in the proper quantity. The present invention provides a method of and means for producing this result.

It is also advantageous in combustion processes using gaseous fuel to supply the fuel in such quantities that the combustible elements of the fuel are supplied in proper amounts. This may not be possible if the fuel is volumetrically measured as the quantity of combustible elements in a unit quantity of fuel may vary with atmospheric conditions for the same reasons as explained above. According to the present invention the supply of gaseous fuel may also be controlled in such a manner that the combustible elements will be supplied in the proper amounts.

The difficulty in obtaining satisfactory regulation of air and fuel by methods based on volumetric measurement is greater in combustion processes in which gaseous fuels are used than in processes not employing gaseous fuel. In many furnaces, for instance in which gaseous fuel is used, it is essential that the heat in the furnace be kept under the best possible control, in order that the molten materials may be as homogeneous as possible. It is also essential that the gaseous fuel and air be supplied in such proportions that not only efficient combustion takes place but also the proper chemical reactions in the furnace take place. The raw materials fed to the furnace are also carefully controlled to produce the proper chemical reactions in the furnace. If the fuel and air supplies are regulated volumetrically, with total disregard to their combustible and oxygen content, the above results cannot be obtained.

The above discussion shows the advantages of controlling the supply of air or gaseous fuel in such a manner as to supply oxygen in the air or the combustible elements in the fuel in the proper quantities. In many instances it may be desirable to furnish a supply of air, gas or other fluid at a constant rate regardless of whether its oxygen or combustible content is properly controlled. For instance, if an excess of air is furnished in a combustion process the products of combustion are diluted and the efficiency of the process is decreased. For this and other reasons it may be desirable to supply the air at a predetermined constant rate. Furthermore it is desirable in combustion processes using gaseous fuel to be as economical with the fuel as possible because the gas which is not used to heat the ovens is often sold as surplus gas. It is therefore desirable to measure the gas and supply the same at a predetermined constant rate. Certain phases of this invention deal with an improved method of and apparatus for producing these results.

One object of the invention is to provide improved means and an improved method of supplying a fluid at a constant rate.

Another object is to supply oxygen for various uses at a constant rate.

Another object is to control the supply of gaseous fuel or air or both to combustion processes so that the proper amount of fuel or of oxygen or of both is supplied independently of variations in the pressure or temperature conditions of the gaseous fuel or air and also substantially independently of saturation conditions.

Another object is to maintain constant the proportion of oxygen supplied in combustion and chemical processes until the proportion is intentionally changed.

Another object is to automatically vary the amount of oxygen supplied in various processes in accordance with variations in the supply of other constituents used in the processes.

Another object is to provide means for regulating the amount of gaseous fuel and oxygen supplied to combustion processes without altering the proportion in which they are supplied.

Another object is to provide means for altering when desired the proportions in which the oxygen and gaseous fuel are supplied in combustion processes.

Other objects will appear as the specification proceeds.

In accordance with the present invention the air of fuel supply or both is measured by means of a fluid meter which measures them independently of temperature or pressure conditions, and the meter is caused to regulate automatically the amount of fluid supplied in accordance with such measurement and also substantially independently of saturation conditions. According to those phases of the invention which deal with supplying fluid at a constant rate regardless of its oxygen or combustible content the fluid meter need not have the above characteristics, although, as will hereinafter appear, such characteristics are an advantageous asset.

The invention is illustrated in the accompanying drawings in which

Fig. 6 is a diagrammatic view illustrating a modification of the system disclosed in Fig. 4, and Figs. 7, 8 and 9 are side elevations partly in section of units of mechanism capable of furnishing a fluid at a predetermined constant rate.

The meter used for measuring the supply of the fluid constituents of the combustible mixture is of that type commonly known as a Thomas meter. In order that the invention may be fully understood, it is necessary to have a knowledge of the principle of operation of this type of meter. One form of Thomas meter is diagrammatically illustrated in Fig. 1 and will now be described.

Figure 1:
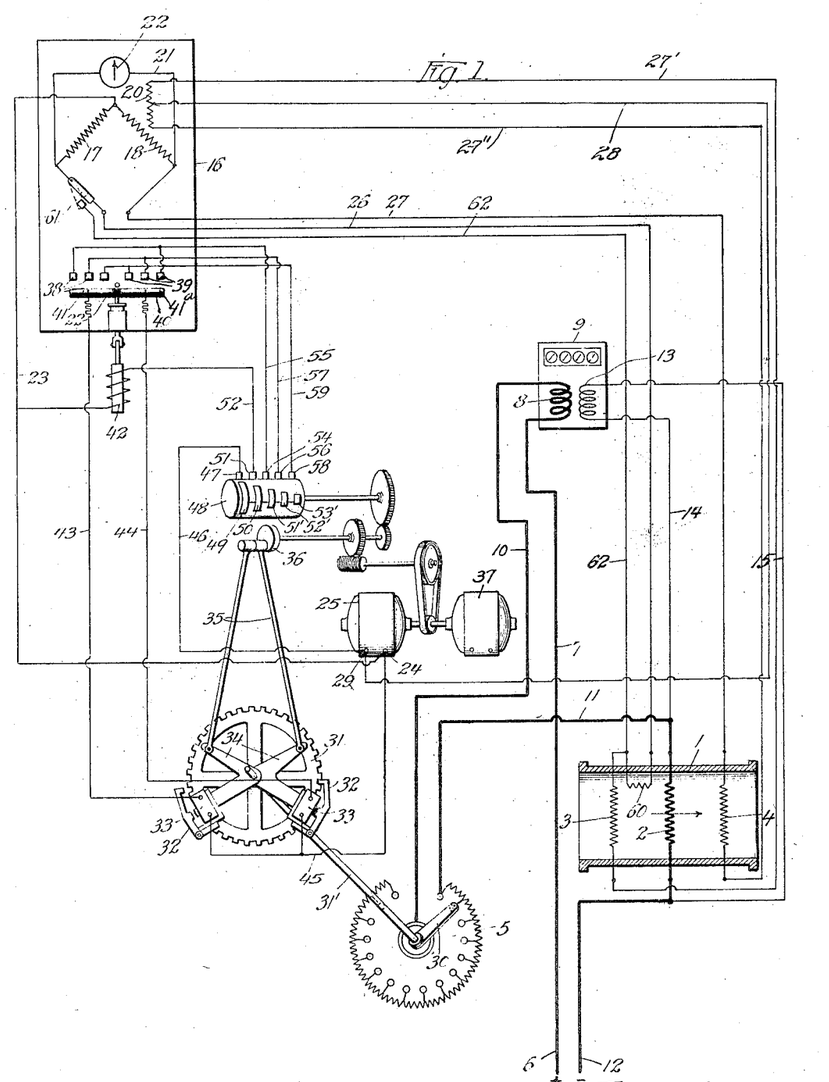
Figure 1 is a simplified diagrammatic view of the fluid meter which is employed.

The meter comprises in general a housing through which the fluid to be measured flows. An electric heater is located in the housing and on each side of the heater is located an electric thermometer whose resistance varies with a variation in temperature. The first thermometer is affected by the temperature of the incoming gas and the second thermometer is affected by the temperature of the gas after being heated by the heater. The two thermometers are connected to automatic devices for varying a rheostat connected in series with the heater. The two thermometers cause the automatic devices to vary the rheostat and hence the heat dissipated from the heater so that a constant temperature rise of the fluid is maintained between the two points at which the thermometers are located. In short, the heat imparted to the fluid is varied as the rate of flow of the fluid varies, so as to raise the temperature of the fluid through a fixed number of degrees. In practice the temperature of the fluid is usually raised approximately two degrees and this is hereinafter referred to as the "temperature difference." The electrical energy which is supplied to the heater and which is necessary to maintain this constant temperature difference is a measure of the rate of flow of the fluid. A wattmeter when calibrated in terms of rate of flow of the fluid, and properly connected to the heater will therefore indicate the rate of flow of the fluid.

The above mentioned housing is shown at 1. The electric heater 2 is located in the housing, and at one side thereof is placed the thermometer resistance 3, and at the other side the thermometer resistance 4.

The electrical energy supplied to the heater 2 is controlled by means of a rheostat 5. Current passes to the heater 2 from the positive main 6 through a conductor 7, then through the current coil 8 of a wattmeter 9, through conductor 10 to the rheostat 5, then by way of the conductor 11 to the heater, and from the heater to the negative main 12. The voltage coil 13 of the wattmeter 9 is shunted across the heater 2 by means of the conductors 14 and 15. The rheostat 5 therefore serves to vary the amount of electrical energy supplied to the heater 2, and the wattmeter 9 indicates the amount of electrical energy supplied to the heater. The wattmeter 9 is calibrated preferably to read in terms of rate of flow of the fluid, and therefore, the rate of flow of the fluid may be ascertained by merely reading the wattmeter.

The above mentioned automatic devices connected to the thermometers 3 and 4, for varying the rheostat 5, comprise an automatic switch 16, including a Wheatstone bridge and galvanometer, the needle of the galvanometer forming one contact member of the controlling switch.

In the upper part of the illustration of the switch 16, there are illustrated diagrammatically the conductors of the Wheatstone bridge, comprising fixed resistances 17 and 18 and a cross wire 21, connected to a galvanometer, of which 22 is the needle. In the lower part of the illustration of switch 16 the needle 22 is shown in its actual position. A conductor 23 connects the resistances 17 and 18 to one terminal 24 of a generator 25. The thermometer resistances 3 and 4 are connected in two of the arms of the Wheatstone bridge by means of conductors 26 and 27 respectively. An adjustable resistance 20 is connected in series with the two thermometer resistances by means of the conductors 27′ and 27″. Current is supplied to the thermometer resistances through both sides of the resistance 20 by means of conductor 28 leading to the generator 25. In the Wheatstone bridge circuit is provided, also a switch 61 and an auxiliary resistance 60. When the switch 61 is in the full-line position shown in Figure 1 the auxiliary resistance 60 is in series with the thermometer resistance 3, but when the switch 61 is in the dotted line position current passes directly to the thermometer resistance through a conductor 62 and the auxiliary resistance 60 is then cut out of circuit.

In the adjustment of the Wheatstone bridge the bridge is balanced in the ordinary manner, the switch 61 being in the dotted position, and the balancing resistance 20 is adjusted until no current flows through the cross wire 21, indicating that the two sides of the bridge are in balance. The switch 61 is then moved to the full-line position thus connecting, by means of conductor 26, the auxiliary resistance 60 in series with thermometer resistance 3. This at once throws the bridge out of balance and deflects the needle 22. The balance of the bridge will be restored and the needle 22 will be brought back to normal position, when, by the action of heating coil 2, the resistance of thermometer resistance 4 has been changed by the predetermined rise in temperature so as to equal the combined resistance of thermometer resistance 3 and auxiliary resistance 60. It will be apparent from the connections described that, when, by the action of the heater 2, the temperature of the fluid passing through the conduit 1 is changed so as to vary the resistance of the thermometer resistance 4, with respect to the resistance of the thermometer resistance 3 and auxiliary resistance 60, and thereby vary the resistance on the corresponding side of the Wheatstone bridge, the galvanometer needle will be deflected.

The contact arm 30 of the rheostat is rotated in one direction or the other by a ratchet wheel 31, connected to the same shaft 31′ as the rheostat arm 30. The ratchet wheel 31 is rotated by electrically operated pawls 32 controlled by electromagnets 33. Each pawl is carried by a rocker-arm 34, which is oscillated continuously by a connecting rod 35, driven by a crank 36, which is rotated continuously by a motor 37, through suitable reduction gearing. The motor 37 is also utilized to drive the generator 25. The pawls 32 are normally held out of mesh with the teeth on the ratchet wheel 31 by gravity, but either pawl may be drawn into engagement with said teeth upon the energization of the corresponding electromagnet 33, to impart a step by step rotation to said ratchet wheel.

The energization of the magnets 33 is controlled by the galvanometer needle 22, which swings freely about its pivot when the Wheatstone bridge is unbalanced. A plurality of contacts are arranged directly above the galvanometer needle in two groups, the contacts of one group being indicated at 38, and those of the other group at 39. In the present instance there are three contacts in each group. Under the contacts 38 and 39 is located an insulating support 40, carrying a contact strip 41, located below the contacts 38, and a contact strip 41ª, located below the contacts 39. The insulating support 40 is periodically reciprocated by the electromagnet 42. The arrangement is such that if the needle 22 is deflected to one side or the other, the elevation of the support 40 will cause the galvanometer needle to be clamped for a definite interval of time between one of the two contact strips on the support 40, and one of the several contacts immediately above the needle. The contact strip 41 is electrically connected by means of the conductor 43 to one of the electromagnets 33, and the contact strip 41ª is connected by means of a conductor 44 to the other of said electromagnets. The two electromagnets are connected by means of a conductor 45 with the terminal 24 of the generator, and the other terminal 29 of the generator is connected by means of a conductor 46 to a finger 47 of a contact drum 48. The drum 48 carries a series of electrically connected contact segments, the first of which, shown at 49, is arranged to make contact with the finger 47. The second segment 50 co-operates with the finger 51, which is electrically connected, by means of the conductor 52, to the coil of the electromagnet 42, for reciprocating the support 40. Three other contact segments 51′, 52′ and 53′ are provided, of successively decreasing length. The longest of these three segments, 51', co-operates with a finger 54, which is electrically connected by means of a conductor 55, to the two extreme contacts above the galvanometer needle. The contact segment 52' co-operates with a finger 56, which is electrically connected by means of the conductor 57, to the second and fifth contacts above the galvanometer needle. The contact segment 53' co-operates with a finger 58, which is electrically connected by means of a conductor 59, with the two innermost contacts above the galvanometer needle.

The contact drum 48 is rotated through suitable reduction gearing from the motor 37. As the contact drum 48 is rotated, the contact segment 49 comes in contact with the finger 47, and when the second contact segment 50 comes in contact with the finger 51, a circuit is completed through the electromagnet 42, to lift the support 40. If the galvanometer needle 22 has been deflected to one side or the other by a change in the relative resistance of the thermometers 3 and 4, said needle will be clamped between one of the two contact strips 41 and 41ª, and one of the contacts 38—39, depending in which direction the needle is deflected, and the extent of the deflection. Assume that the needle 22 is deflected a slight amount to the left in the drawing. When the support 40 rises, the needle will be clamped between the contact strip 41 and the innermost of the three contacts 38. Therefore, when the segment 53' of the contact drum reaches the finger 58, a circuit will be completed through the left hand magnet 33, and this magnet will be energized for a period, the length of which will depend upon the length of the segment 53'. In the present instance, the segment 53' is of such length as to cause the magnet 33 to be energized long enough to move the ratchet wheel 31 a distance of one tooth. If the galvanometer needle 22 had been deflected to the right and clamped between the contact strip 42 and the innermost of the three contacts 39, a circuit would have been completed through the right hand magnet 33, but through the same contact segment on the drum. In this case, the ratchet wheel 31 would have been rotated in the opposite direction, but the same amount. If the galvanometer needle 22 is deflected a greater amount to the left, it will be clamped against the middle contact 38. In this case, the left hand magnet 33 will be energized, and the period of energization will be controlled by the segment 52' on the contact drum. The deflection of the galvanometer needle 22 an equal distance to the right would cause the circuit to be completed through the same contact segment, but through the right hand electromagnet 33. The segment 52' is of such length as to cause the magnet 33 to be energized long enough to move the ratchet wheel a distance of two teeth. Likewise, if the galvanometer needle is clamped under either of the extreme contacts, a circuit will be completed through the segment 51' of contact drum, and through either of the magnets 33, depending in which direction the galvanometer needle is deflected. The contact strip 51' is of such length as to cause the magnet 33 to be energized long enough to move the ratchet wheel a distance of three or more teeth. The rheostat arm 30 is therefore shifted a certain amount in one direction or the other, depending upon the direction and amount of deflection of the galvanometer needle. The amount and direction of deflection of the galvanometer needle depends upon the change in the relative resistance of the two thermometers.

Any change in the relative resistance of the two thermometers, or, in other words, any deviation from the predetermined constant temperature difference causes an unbalancing of the system and is indicated by the galvanometer whereupon the energy dissipated in the form of heat is varied by the rheostat to restore the balance. It will be seen that the energy dissipated is a measure of the flow of the fluid. If more gas is flowing it will require more energy to maintain the constant temperature difference. If less gas is flowing less energy will be required. The wattmeter 9 may therefore be used in conjunction with suitable calibration curves to determine the rate of flow of the fluid or the wattmeter may be calibrated to read directly in terms of rate of flow.

The auxiliary resistance 60 is called in practice a temperature difference coil because of its function. It is usually located in the conduit so that its resistance will change when the temperature of the fluid changes. The auxiliary resistance is made of two materials one of which compensates for the error produced by the fact that the temperature-resistance curve of the thermometers is not a straight line but a curve. This function of the temperature difference coil need not be explained as it has no direct bearing upon the present invention other than that it makes the meter more accurate. The other material forming a part of the temperature difference coil causes the meter to measure the rate of flow independent of saturation conditions of the fluid. Under some conditions the specific heat of the gas does not remain constant under different conditions of temperature and pressure. For example let it be assumed that a saturated gas at a pressure of 30 inches of mercury and 60 degrees F. be heated to 100 degrees F. Its specific heat at either temperature is nearly the same, but if it is allowed to absorb all the aqueous vapor that it will hold at 100 degrees, that is if it absorbs additional aqueous vapor until it is saturated at 100 degrees, each original cubic foot of gas will carry through the meter this added quantity of aqueous vapor. This added material will require an additional amount of heat to raise its temperature the fixed amount and the meter will read too high. It is desired in commercial work that the meter record in units of saturated gas at 60 degrees, regardless of the actual temperature of the gas flowing through the meter. In this case the quantity of aqueous vapor absorbed, and the error due to it, are functions of temperature. Now, if, as the temperature of the gas increases and the specific heat correspondingly increases, the temperature difference between the thermometers can be correspondingly decreased the meter will record correctly. This is one function of the temperature difference coil 60. The material of which a portion of the coil is made is so chosen as to properly decrease the temperature difference between the thermometers as the temperature of the gas increases.

It will now be seen that a Thomas meter of the type above described is capable of measuring the rate of flow of a fluid independently of temperature or pressure and also substantially independently of saturation conditions of the fluid. In other words, if the standard unit of measurement is a cubic foot of saturated fluid at 60 degrees F. and 30 inches of mercury the meter will always measure the number of such standard units irrespective of variation in temperature or pressure and also substantially independently of saturation conditions.

With the above explanation in view it is apparent that if a Thomas meter may be made to measure the air supply in a combustion process and the supply of air be controlled in accordance with the operation of the meter, the air will be supplied in standard units irrespective of temperature or pressure and also substantially independently of saturation conditions, and therefore the proper quantity of oxygen will be supplied irrespective of a change in any one or more of the above conditions because a standard unit of air contains a fixed quantity of oxygen.

Figure 2:
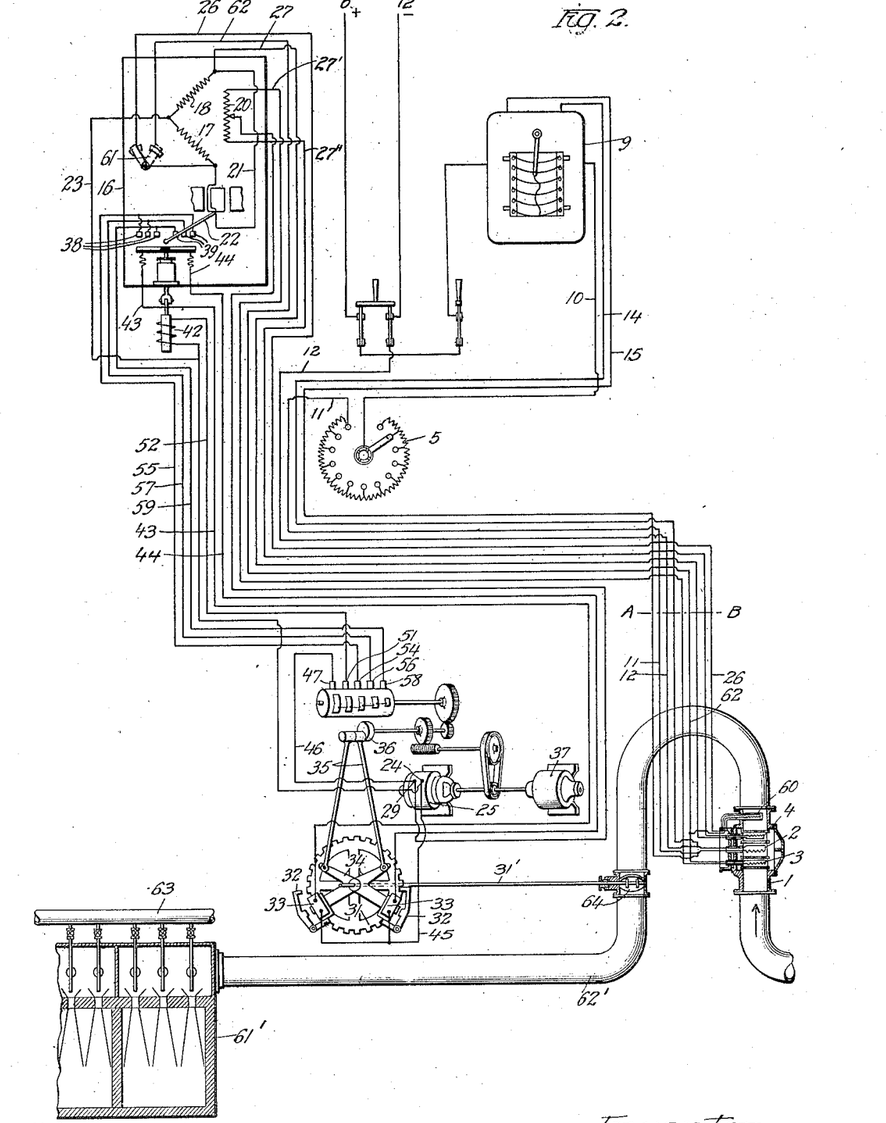
Fig. 2 is a diagrammatic view showing the fluid meter used for controlling the air supply in a furnace which utilizes gaseous fuel.

Fig. 2 shows a Thomas meter arranged to control the supply of air to any kind of a furnace. If the furnace is a blast furnace the solid fuel may be fed to the furnace in proper quantities in any suitable manner, and if the furnace utilizes gaseous fuel the fuel may be conducted to the furnace by means of pipes or conduits and regulated in any suitable way. Air may be supplied through a pipe 62' and gaseous fuel may be supplied through a pipe 63. The fuel and air mix in the furnace to produce a combustible mixture in the well known manner. It is assumed in Fig. 2 that the fuel can be supplied under practically constant temperature, pressure and saturation conditions and that it can be satisfactorily measured by volumetric or other measuring means. Therefore a Thomas meter is used only in the air supply conduit.

In Fig. 2 and the subsequently described figures the diagrammatic representation of the parts of the meter is a little more in keeping with the commercial form of the meter. However, all of the circuits are practically the same as in Fig. 1 and the parts are represented by the same reference characters. It is, therefore, not necessary to describe the circuits and the meter parts of Fig. 2 in detail.

The electric heater 2 of the meter and the thermometer resistances 3 and 4 including the temperature difference coil 60 are positioned in the path of the air passing to the furnace 61'. The thermometer resistances control the movement of the shaft 31' in exactly the same manner as this shaft is controlled in Fig. 1. However, these two important differences between Fig. 2 and Fig. 1 should be noted. The first difference is that in Fig. 2 the shaft 31', instead of actuating a rheostat, is connected to a valve 64 located in the air supply pipe 62'. Movement of the shaft 31' will therefore serve to regulate the valve 64. The second difference is that energy is supplied to the heater 2 at a constant rate instead of being varied by the rheostat 5.

It is obvious from the description of the Thomas meter hereinbefore given that if energy is supplied to the heater at a constant rate the Wheatstone bridge may be made to balance when the air passing through the conduit is flowing at a certain rate. The meter in Fig. 2 may therefore be so adjusted as to be in a state of balance when air is flowing through the conduit 62' at a predetermined rate. Under these conditions the fluid will be flowing at just the proper rate to cause the heat imparted to the fluid by the heater 2 to raise the temperature of the fluid the proper amount so that the relative resistance of the two thermometers, corresponding to the state of balance of the meter, will not be changed. Now if the rate of flow of the air increases above the predetermined rate the heat imparted to the fluid by the heater 2 will not be sufficient to raise the temperature of the air the required amount to preserve the state of balance. In other words, as the heat dissipated from the heater 2 remains constant and the rate of flow increases, the temperature of the air will not be increased as much as when the air is flowing at the predetermined rate. Consequently the thermometer 4 will respond to this change in temperature of the air and the resulting change in the relative resistance of the two thermometers 3 and 4 will cause the shaft 31' to be actuated in exactly the same manner that the same shaft is actuated in Fig. 1. The valve 64 will be shifted by the shaft 31' and thus cut down the rate of flow of the air until the air is again flowing at the predetermined rate and the meter is restored to a state of balance.

On the other hand if the rate of flow of the air decreases below the predetermined rate, the constant rate of heat dissipated from the heater 2 will heat the air more than when the air is flowing at its predetermined rate. This will cause the relative resistance between the thermometers to actuate the shaft 31' in such a direction as to open the valve 64 thereby increasing the rate of flow of the air until the air is again flowing at its predetermined rate. The meter, therefore, serves to supply air to the furnace at a constant predetermined rate. As the meter measures the rate of flow in standard units of air independent of temperature or pressure and also substantially independently of saturation conditions it is obvious that the air supply to the furnace is such that the oxygen supply remains constant for reasons hereinbefore set forth. It is obvious that the fuel may also be supplied at a predetermined constant rate and measured in standard units of measurement in the same manner as described above in connection with the air supply. The combustible elements of the fuel will then be supplied at a constant rate independent of temperature or pressure and also substantially independently of saturation conditions.

Figure 3:
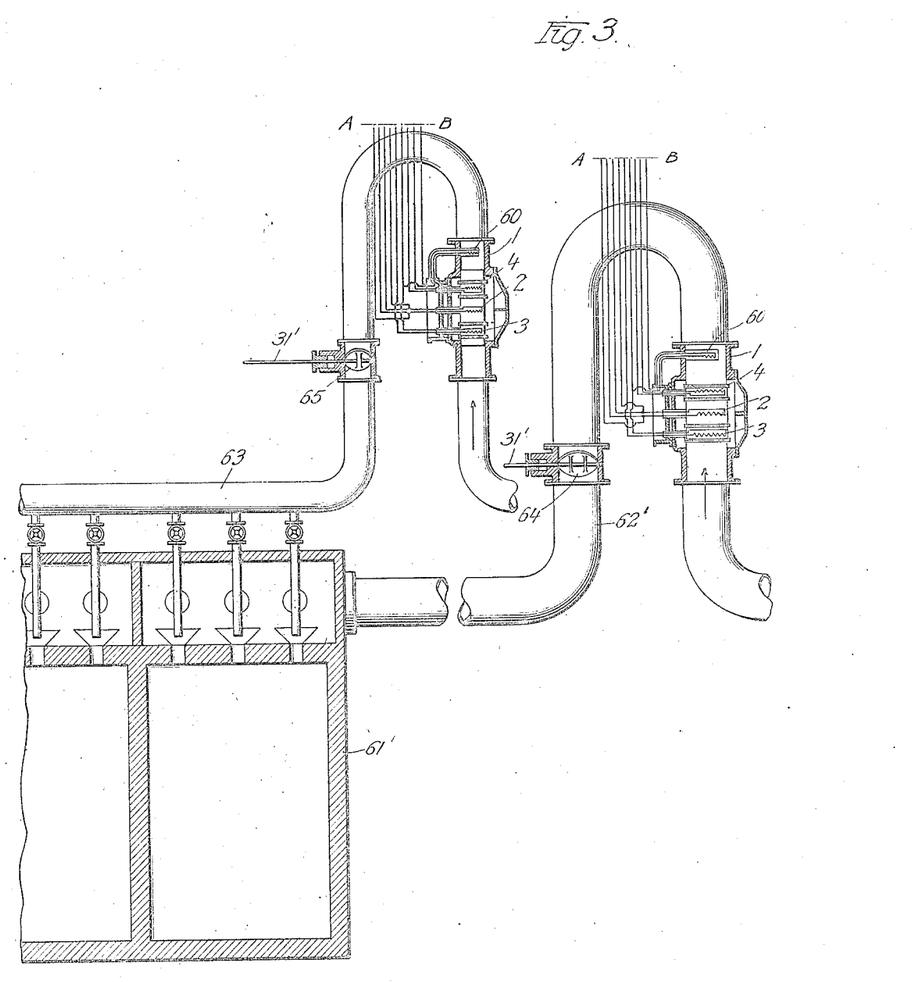
Fig. 3 is a diagrammatic view illustrating how fluid meters may be used to control both the air and gaseous fuel supply.

In Fig. 3 there is shown a meter associated with the air supply conduit and a meter associated with the fuel supply conduit. In this case both the air and fuel are measured in terms of standard units irrespective of temperature or pressure and also substantially independently of saturation variations. In this figure only those portions of the apparatus which are associated directly with the supply conduits are shown. It will be understood that these parts are connected with controlling devices in the same manner as shown in Fig. 2. The only difference between Fig. 2 and Fig. 3 is that in Fig. 3 the supply of fuel to the furnace 61' through the conduit 63 is also controlled by a Thomas meter. A valve 65 is automatically actuated by a meter in the same manner that the valve 64 in the air supply pipe 62' is actuated by a meter. In Fig. 3 the Thomas meter associated with the fuel supply pipe serves to supply the fuel at a constant predetermined rate, and the Thomas meter associated with the air supply pipe serves to supply oxygen in exactly the right amount for the fuel. The amount of fuel and air to be supplied is previously decided upon and therefore the two Thomas meters preserve the proportion in which the fuel and oxygen are supplied. This proportion between the fuel and oxygen is maintained regardless of temperature or pressure and also substantially independently of saturation conditions either of the fuel or the air.

Referring again to Fig. 1 it will be apparent that the temperature difference resistance 60, instead of being a fixed resistance that causes a certain amount of heat to be imparted to the fluid to produce the predetermined temperature difference, might be made adjustable or variable. The value of the temperature difference resistance 60 determines the rise in temperature of the fluid which is necessary before the Wheatstone bridge will balance. Therefore this temperature rise may be made greater or less by varying the value of the temperature difference resistance 60. Therefore if the value of the temperature difference resistance be varied when the meter is used for controlling the rate of flow of fuel or air, the amount of fuel or air permitted to pass to the furnace will be varied. This is due to the fact that a different quantity of air or fuel must now flow by the thermometers and heater to maintain the proper temperature difference because the temperature difference has been changed. This feature is illustrated in Fig. 4.

Figure 4:
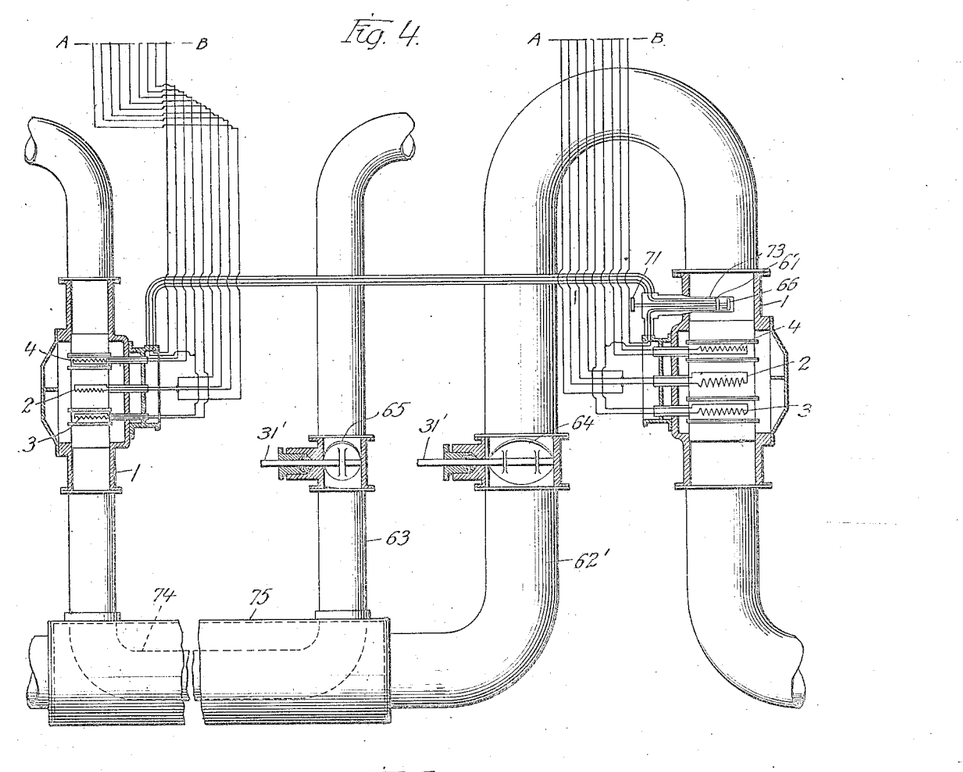
Fig. 4 is a diagrammatic view illustrating one manner in which an adjustment of the meter for the fuel supply to vary the amount of fuel admitted may cause automatically a corresponding adjustment of the meter for the air supply.
Figure 5:
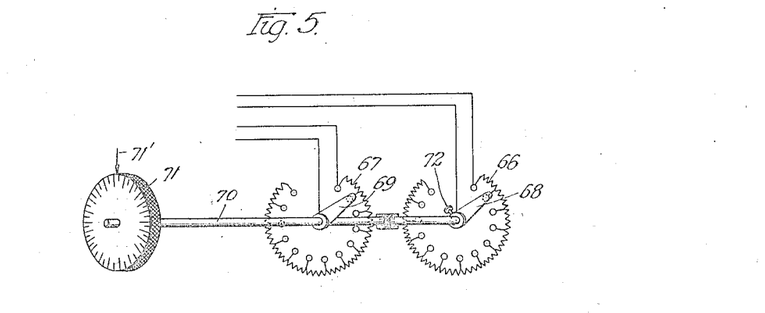
Fig. 5 is a perspective view of a detail of construction used in Fig. 4.

In Fig. 4 the Thomas meters are associated with the air supply pipe 62' and the fuel supply pipe 63 in the same manner as in Fig. 3. The temperature difference coil for the air meter is made adjustable and is represented in Fig. 5 as a rheostat 66. The temperature difference coil for the fuel meter is also represented as a rheostat and is shown at 67. By placing the rheostat arms 68 and 69 of the two rheostats upon a common actuating shaft 70 and providing an adjusting wheel 71 it is obvious that the temperature difference coils of the two meters may be simultaneously adjusted. When one of the temperature difference coils is adjusted it changes the temperature rise which is necessary before the Wheatstone bridge of that meter will balance as above stated. Therefore, the meter is virtually reset so that it will change the quantity of the fluid constituent permitted to pass to the furnace. When a change is made in the quantity of fuel or air delivered to the furnace it usually happens that a corresponding change is desired in the quantity of the other constituent delivered to the furnace so as to maintain the proper ratio or proportion between the constituents. It is for this purpose that the two adjustable temperature difference coils are provided with common adjusting means as shown in Fig. 5. If the quantity of raw materials supplied to the furnace be increased the temperature difference resistance which determines the fuel supply should be correspondingly decreased. When this is done the temperature difference resistance which determines the air supply will be automatically decreased to preserve the proportion. A pointer 71' co-operating with suitable marks on the wheel 71 may indicate the adjustments necessary in order to cause the fuel to be supplied in proper quantity for the quantity of raw materials.

Obviously independent adjusting means may be employed for the two temperature difference coils if desired. In this case by adjusting the temperature difference coils independently of each other the proportion between the quantity of fuel and the quantity of air may be changed. Such an independent adjustment of the temperature difference coils is permitted by the structures shown in Figs. 4 and 5 by securing one of the rheostat arms, for instance that shown at 68, to the shaft 70 by means of a set screw 72. By loosening the set screw 72 the arm 68 may be shifted on the arm 70, or the arm 69 may be shifted by turning the wheel 71 without affecting the position of the arm 68. When such an arrangement as shown in Fig. 5 is employed the two temperature difference coils are preferably both located in one meter housing where they may be conveniently adjusted simultaneously as shown at 73 in Fig. 4. In this case the temperature difference resistance 67 is properly connected with the thermometer resistance 3 of the fuel meter, and the temperature difference resistance 66 is properly connected with the thermometer resistance 3 of the air meter. As both of the temperature difference resistances are located in the path of the air passing through the conduit 62' their temperature is determined by the temperature of the air. This would ordinarily be objectionable because the temperature difference resistance for the fuel meter should be subjected to the same temperature variations as the thermometer resistances of the fuel meter, and the temperature difference resistance for the air meter should be subjected to the same temperature variations as the thermometer resistances of the air meter. This objection is overcome by bringing the temperature of the fuel to approximately the same temperature as the air before the fuel is metered. A portion 74 of the fuel supply pipe is, therefore, made to pass through a jacket 75 communicating with the air conduit 62' and through which the air passes on its way to the furnace. A portion of the fuel supply pipe is therefore jacketed by the air and the two constituents are therefore at approximately the same temperature when metered. The result of this arrangement is that the temperature difference coil for the fuel meter is subjected to approximately the same temperature conditions as it would be it if were located directly in the fuel conduit.

Figure 6:
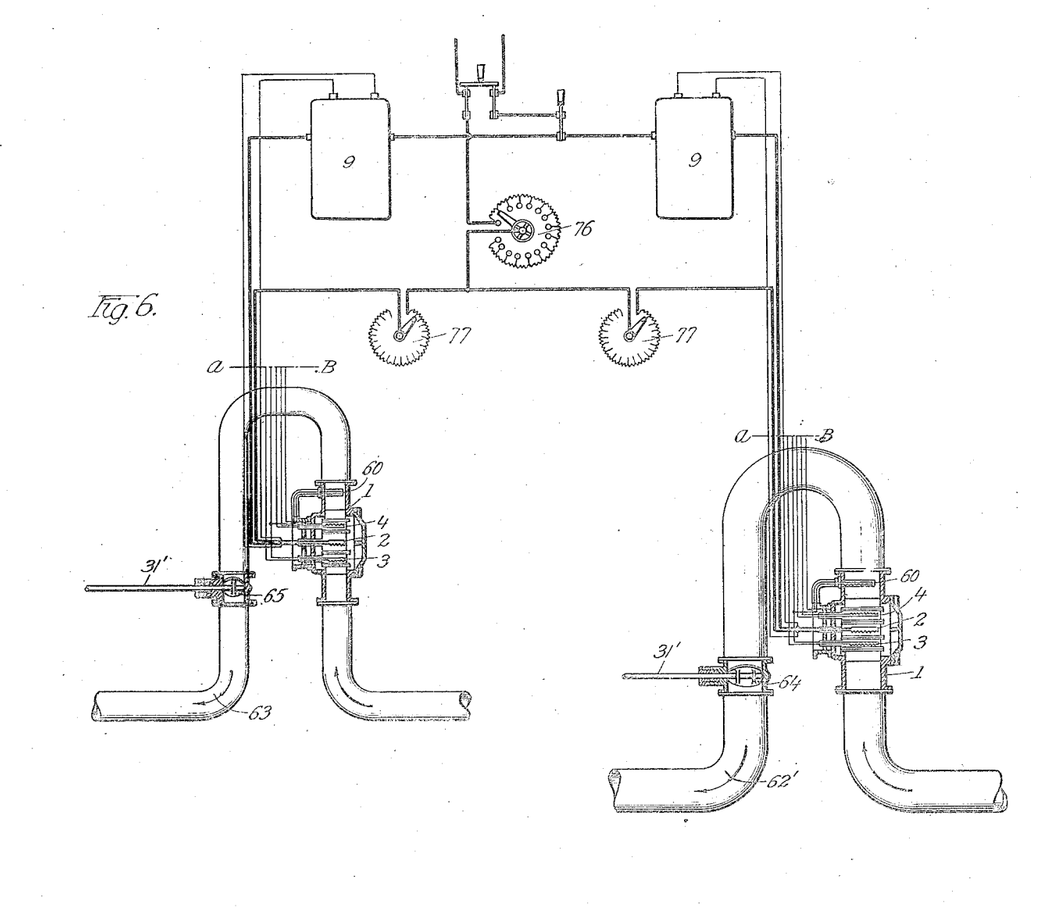

Fig. 6 discloses a system in which substantially the same results obtained in Fig. 4 are produced by different means. A number of parts have been omitted in this figure also as their illustration is not necessary for an understanding of the modification disclosed in this figure. However the complete heater circuits have been illustrated as the following explanation deals principally with these circuits and the devices connected therein.

In Fig. 6 a meter and a controlling valve are associated with the air supply pipe 62', and the fuel supply pipe 63 in the same manner as in the previous figures. In the main circuit there is provided an adjustable rheostat 76 which regulates the energy supplied to both heaters of the meters. From the discussion of the operation of a Thomas meter it is evident that by changing the rate at which heat is dissipated from the heater of the meter the same result is produced as if the resistance of the temperature difference coil of that meter were changed. In other words, when the rate at which heat is imparted to the fluid is increased a greater quantity of fluid will have to flow by the heater and thermometers to maintain the predetermined temperature difference. Therefore, by adjusting the rheostat 76 the heat dissipated from both of the heaters of the meters is either increased or decreased, and this results in an actuation of the controlling valves until the proper quantity of fuel and air are flowing through the conduits to maintain the predetermined temperature rise of the air and fuel. The adjustment of the rheostat 76, therefore, corresponds to the simultaneous adjustment of the two temperature difference coils in Figs. 4 and 5 as it varies the quantity of air and fuel delivered to the furnace without changing the ratio or proportion in which they are supplied.

In circuit with the heater of each meter there is placed an adjustable rheostat 77. These are for the purpose of varying the quantity of heat dissipated from either heater independently of the other. Therefore these two rheostats constitute means for varying the quantity of either of the constituents passing to the furnace, and for changing the ratio or proportion in which the constituents are supplied.

It will now be seen that a Thomas meter may be associated with either the air supply conduit or the fuel supply conduit, or both to regulate and control the quantity of oxygen or fuel, or both oxygen and fuel admitted to the furnace or other place where combustion of the constituents takes place.

Due to the fact that a Thomas meter measures the rate of flow of a fluid independently of temperature or pressure, and also substantially independently of saturation conditions the air is measured in standard units, and as the oxygen contained in a standard unit of air is a fixed quantity it is obvious that the meter actually measures the quantity of oxygen supplied. By causing the meter itself to control the rate of flow of the air, the oxygen supplied to the furnace may therefore be maintained constant and this is true regardless of changes in temperature or pressure and also substantially independently of saturation conditions of the air.

When it is desired to change the quantity of fuel or air admitted to the furnace by the meter it is only necessary to make a simple adjustment. When a meter is associated both with the fuel and air supply pipes and it is desired to alter the quantity of fuel admitted for any reason, such as a change in the amount of raw products treated, it is possible to simultaneously make a corresponding change in the quantity of air admitted so as not to destroy the proportion in which the fuel and air are supplied.

Figure 7:
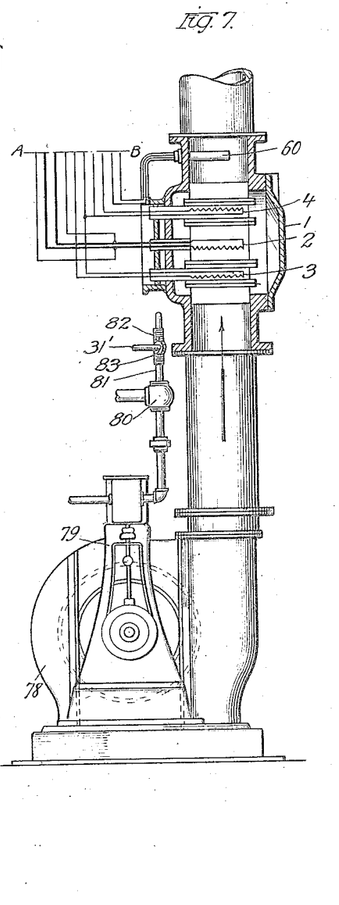
Figure 8:
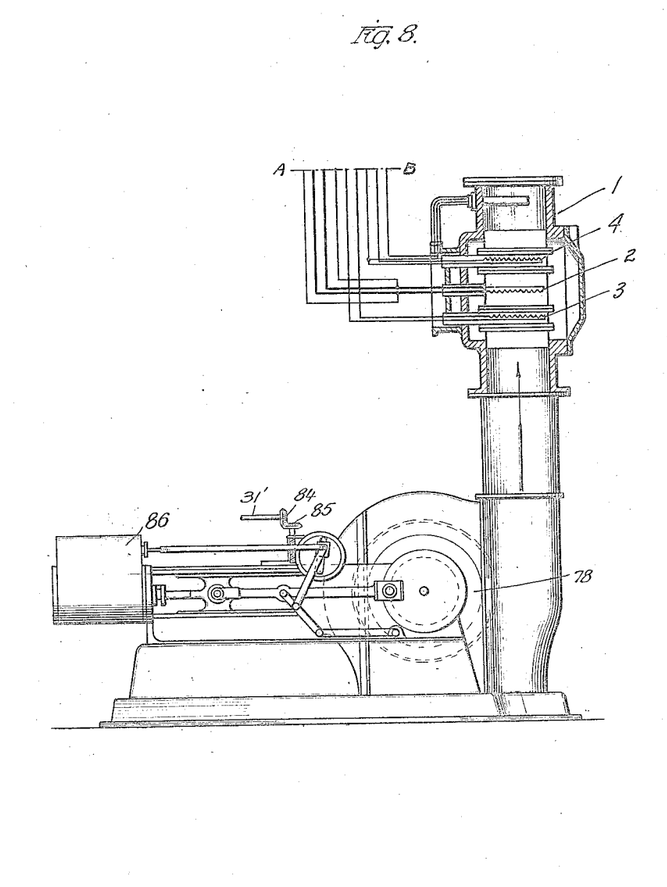

Obviously the quantity of the constituents admitted to the furnace may be controlled in other ways than by means of the regulating valve shown. For instance, the shaft 31' may control the speed of the engine that drives the pump or blower. This may be done by causing the shaft 31' to actuate a valve which will throttle the steam supply to the engine as shown in Fig. 7, or the shaft 31' may be made to manipulate the cut-off of an engine as shown in Fig. 8. If the pump is driven by an electric motor the shaft 31' may be made to actuate a rheostat which in turn controls the speed of the motor as shown in Fig. 9.

In Fig. 7 the blower is shown at 78. It is driven by a steam engine 79 to which the supply of steam is controlled by a throttle valve 80. The stem 81 of the throttle valve has a rack 82 which meshes with a pinion 83 carried by the shaft 31'. The shaft 31' is actuated by the meter in the manner described above to throttle the supply of steam to the engine, thus causing the engine to drive the blower at such a speed that the fluid will be delivered at a predetermined and constant rate of flow.

In Fig. 8 the shaft 31' which is controlled by the meter acts through bevelled gears 84 and 85 to vary the point of cut off of the slide valve of the steam engine 86. The engine, therefore, drives the blower 78 at the proper speed to deliver the fluid at a predetermined constant rate of flow.

Figure 9:
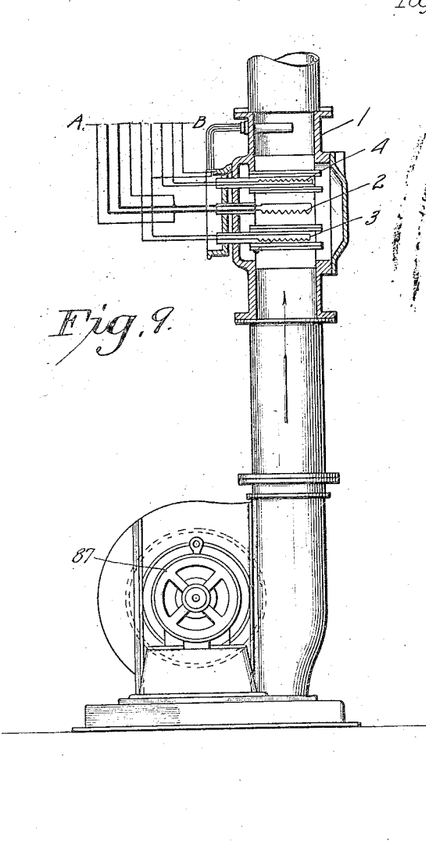
Figure 10:
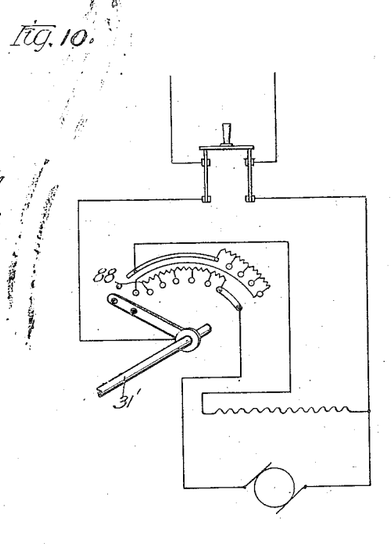
Fig. 10 is a schematic and diagrammatic view illustrating more fully certain features of Fig. 9.

In Fig. 9 the blower 78 is driven by an electric motor 87. The speed of the motor is controlled by a rheostat 88 which is actuated by the shaft 31' that is controlled by the meter. The motor speed is therefore varied to cause the blower to deliver the fluid at a predetermined constant rate of flow.

Although the invention has been described in connection with combustion processes it is obvious that it may be useful for controlling the supply of the fluid constituents of any mixture. In fact according to certain phases of the invention the constituents do not even have to be mixed for the invention provides novel means for controlling the flow of a fluid regardless of what is done with the fluid after its flow is controlled. This is made clear in Figs. 7 to 9 inclusive, each of which represents a unit of mechanism which is capable of delivering air, fuel, or other fluid at a constant rate regardless of how it is subsequently used. Such a unit of mechanism may be valuable in a good many relations. When the meter is of the Thomas type as disclosed in the drawings, oxygen and the combustible elements of the fuel will also be furnished at a constant rate thus making the units particularly adapted for use in combustion processes but not limited to such use.

A centrifugal blower such as that above shown in Figs. 7 to 9 inclusive is usually governed so that its speed of rotation will remain constant. That does not necessarily mean, however, that the blower will at all times furnish a constant quantity of fluid. The back pressure in the line may prevent the blower from furnishing a constant quantity of fluid due to the fact that the blower is not of the positive type. There is, therefore, a particular advantage in associating a meter with a blower to vary the speed of the blower in such a way as to maintain a constant supply of fluid regardless of the back pressure of the line. There is also a distinct advantage of controlling the speed of a blower of this type rather than controlling a valve in the supply line. If the blower were made to operate at a constant speed the regulation of the valve would result in a loss of energy because the blower would continue to operate at the same speed. However, if the speed of the blower is regulated no energy is lost as the blower is at all times making just the proper number of revolutions to maintain the constant supply of fluid. This may not be true with a positive type blower as a blower of the positive type operating at a constant speed has to force a constant quantity of fluid to its destination regardless of the back pressure because there is no way for the fluid to escape.

The method and apparatus herein disclosed may be found useful for controlling the rate of supply of other substances than those herein mentioned. For instance, it may be desirable to measure and so regulate the flow of a fluid as to cause any of its constituents to be supplied at a constant rate.

Although the apparatus herein disclosed has been described in detail it will be understood that the detailed explanation is for the purpose of illustration and that various modifications and changes may be made without departing from the scope or spirit of the invention as defined in the accompanying claims.

Having thus described my invention what I claim and desire to secure by Letters Patent is:

1. The method of controlling the flow of a fluid which comprises effecting a heat transfer involving elements one of which comprises such fluid and utilizing the temperature change so effected in certain of said individual elements for regulation of the flow of such fluid.

2. The method of controlling the flow of a fluid which comprises effecting a heat transfer involving such fluid, utilizing the resultant temperature change of the fluid for regulation of the flow of such fluid and varying certain of two factors namely the heat transfer and the effect of the resulting temperature change to thereby vary the regulation so effected.

3. The method of controlling the flow of a fluid which comprises effecting a heat transfer involving such fluid, utilizing the resultant temperature change of the fluid for regulation of the flow of such fluid and varying one of two factors namely the heat transfer and the effect of the resulting temperature change while maintaining the other of said factors constant, to thereby vary the regulation so effected.

4. The method of proportioning streams of fluids for a mixture thereof wherein the proportioning is a function of temperature changes resulting from separate heat transfers involving the individual streams.

5. The method of proportioning flowing fluids which comprises effecting a heat transfer involving elements including one of such fluids and a proportional heat transfer involving elements including another of such fluids and utilizing the temperature changes so effected in certain of said elements for flow regulation of such fluids.

6. The method of proportioning flowing fluids which comprises effecting a heat transfer involving one of such fluids and a proportional heat transfer involving another of such fluids to thereby effect temperature changes in such fluids, and utilizing such temperature changes for flow regulation of such fluids.

7. The method of proportioning flowing fluids, which comprises effecting a heat transfer involving one of such fluids and a proportional heat transfer involving another of such fluids to thereby effect temperature changes in such fluids, utilizing such temperature changes for flow regulation of such fluids, and varying certain of two factors namely the proportion of such heat transfers and the effect of the resulting temperature changes, to thereby vary the regulation so effected.

8. The method of proportioning flowing fluids, which comprises effecting a heat transfer involving one of such fluids and a proportional heat transfer involving another of such fluids to thereby effect temperature changes in such fluids, utilizing such temperature changes for flow regulation of such fluids, and varying one of two factors namely the proportion of such heat transfers and the effect of the resulting temperature changes while maintaining the other of said factors constant, to thereby vary the regulation so effected.

9. The method of controlling and proportioning flowing fluids, which comprises effecting a heat transfer involving one of such fluids and a proportional heat transfer involving another of such fluids to thereby effect temperature changes in such fluids, utilizing such temperature changes for flow regulation of such fluids, and regulating jointly certain of two sets of factors namely the values of such heat transfers and the effects of such temperature changes, to thereby vary the regulation so effected.

10. The method of controlling and proportioning flowing fluids, which comprises effecting a heat transfer involving one of such fluids and a proportional heat transfer involving another of such fluids to thereby effect temperature changes in such fluids, utilizing such temperature changes for flow regulation of such fluids, and regulating jointly one of two sets of factors namely the values of such heat transfers and the effects of such temperature changes while maintaining the other of said sets of factors constant, to thereby vary the regulation so effected.

11. The method of controlling and proportioning flowing fluids, which comprises effecting a heat transfer involving one of such fluids and a proportional heat transfer involving another of such fluids to thereby effect temperature changes in such fluids, utilizing such temperature changes for flow regulation of such fluids, regulating jointly certain of two sets of factors namely the values of such heat transfers and the effects of such temperature changes to thereby control such flows jointly, and varying certain of the factors of a set independently of other of the factors of such set to thereby regulate the proportion of such flows of fluids.

12. Apparatus for controlling the flow of a fluid, comprising means coacting with the flowing fluid to effect a heat transfer therebetween and flow regulating means subjected to the influence of the resulting temperature change of said fluid.

13. Apparatus for controlling the flow of a fluid, comprising means coacting with the flowing fluid to effect a heat transfer therebetween, flow regulating means subjected to the influence of certain of the resulting temperature changes, and adjusting means for varying certain of two factors namely the value of such heat transfer and the effect of the controlling resulting temperature change, to thereby vary the regulation effected by such flow regulating means.

14. Apparatus for controlling the flow of a fluid comprising means coacting with the flowing fluid to effect a heat transfer therebetween, flow regulating means subjected to the influence of certain of the resulting temperature changes and adjusting means for varying one of two factors namely the value of such heat transfer and the effect of the controlling resulting temperature change while maintaining the other of said factors constant, to thereby vary the regulation effected by said flow regulating means.

15. Apparatus for proportioning streams of fluids comprising in combination, means coacting with one of such streams of fluid to effect a heat transfer therebetween, means coacting with another of such streams to effect a proportional heat transfer therebetween and flow regulating means for such streams subjected to the influence of certain of the temperature changes resulting from such heat transfers.

16. Apparatus for proportioning streams of fluids for a mixture thereof, comprising in combination, flow regulating means for such streams and means subjecting said former means to proportioning control in accordance with temperature changes resulting from heat transfers involving such streams.

17. Apparatus for proportioning streams of fluids for a mixture thereof, comprising in combination, flow regulating means for such streams and means subjecting said former means to control in accordance with temperature changes resulting from proportional heat transfers involving such streams.

18. Apparatus for proportioning streams of fluids for a mixture thereof, comprising in combination, flow regulating means for such streams, means subjecting said former means to control in accordance with temperature changes resulting from proportional heat transfers involving such streams, and adjusting means for varying at will certain of two factors namely the proportion of such heat transfers and the effect of such temperature changes upon said control means, to thereby vary the proportioning of such streams.

19. Apparatus for proportioning streams of fluids for a mixture thereof, comprising in combination, flow regulating means for such streams, means subjecting said former means to control in accordance with temperature changes resulting from proportional heat transfers involving such streams, and adjusting means for varying at will one of two factors namely the proportion of such heat transfers and the effect of such temperature changes upon said control means, while maintaining the other of said factors constant, to thereby vary the proportioning so effected.

20. The combination with a plurality of fluid conduits and means for regulating the respective flows of fluid therein, of means for effecting a heat transfer involving one of said flows and a proportional heat transfer involving another of such flows to thereby effect temperature changes in such flows, means subjecting said flow regulating means to control in accordance with such temperature changes, means for varying the proportion of such heat transfers to thereby vary the proportioning of such flows so effected and means for varying the values of such heat transfers jointly and similarly to thereby vary the rates of such flows while maintaining the proportion thereof constant.

21. The combination with a plurality of fluid conduits and means for regulating the respective flows of fluid therein, of means for effecting a heat transfer involving one of said flows and a proportional heat transfer involving another of such flows to thereby effect temperature changes in such flows, means subjecting said flow regulating means to control in accordance with such temperature changes and means for varying the effects of such temperature changes jointly and selectively upon said flow regulating means to thereby vary respectively the joint rate and the proportion of such flows.

22. Apparatus for controlling the flow of fluid through two separate conduits comprising means in each conduit responsive to variations from a predetermined rate of flow of the fluid in that conduit for maintaining such rate of flow substantially constant, and means for simultaneously causing the means in both of said conduits to be responsive to variations from a different rate of flow.

23. Apparatus for controlling the flow of a fluid comprising regulable means for controlling the rate of flow of the fluid and thermal means in the path of the flowing fluid and responsive to departures from a predetermined rate of flow for actuating said regulable means.

In witness whereof, I have hereunto subscribed my name.

JOHN C. WILSON.